United States Patent [19]
Fite, Jr.

[11] 3,846,460
[45] Nov. 5, 1974

[54] METHOD OF MANUFACTURING COPPER OXALATE

[75] Inventor: Charles C. Fite, Jr., East Windsor, N.J.

[73] Assignee: Cities Service Company, New York, N.Y.

[22] Filed: Apr. 25, 1973

[21] Appl. No.: 354,275

[52] U.S. Cl................ 260/438.1, 260/439, 260/999
[51] Int. Cl. .............................................. C07f 1/08
[58] Field of Search.......................... 260/438.1, 439

[56] References Cited
OTHER PUBLICATIONS
Chem. Abstracts, Vol. 3, pg. 1969 (1909).
Chem. Abstracts, Vol. 544, p. 7415eg (1960).
Chem. Abstracts, Vol. 55, p. 26577i–26578b (1961).

*Primary Examiner*—H. Sneed
*Attorney, Agent, or Firm*—Joshua J. Ward; Howard M. Ellis

[57] ABSTRACT

A ferrous salt is reacted with a soluble oxalate to yield ferrous oxalate which is subsequently slurried with a copper salt to produce copper oxalate. This improved process for manufacturing copper oxalate yields a copper oxalate which is easily separated by filtration in substantially pure form; it is readily washable and dries as a very fine powder that requires no grinding.

11 Claims, No Drawings

METHOD OF MANUFACTURING COPPER OXALATE

BACKGROUND OF THE INVENTION

This invention relates to a method of manufacturing copper oxalate. More specifically, this invention encompasses an improved process for copper oxalate production that involves reacting a ferrous salt with a soluble oxalate to yield ferrous oxalate which can subsequently be slurried with a copper salt to produce copper oxalate.

The conventional method of manufacturing copper oxalate is to react aqueous solutions of copper sulfate and oxalic acid. This reaction results in a finely divided product that quickly plugs any filter and thus renders a filtration step almost impossible. This reaction also yields a very pasty filter cake which cannot be thoroughly washed without subsequent repulping and filtrations, each of which is as difficult as the preceeding one. This filter cake also dries to a very hard mass, regardless of the method of drying. It also requires mechanical grinding to realize any of the benefits derived from its inherently small particle size.

The extreme difficulty in filtration and the hardness of the resulting product render copper oxalate unduly expensive and difficult to manufacture. That is, these factors augment the manufacturing cost so as to render the product unable to compete successfully in the market place as a fungicide, despite its excellent fungicidal properties. The difficulty in filtration and the hardness of the final product also discourage the manufacture of copper oxalate in large quantities.

My method of manufacturing copper oxalate yields a readily filterable, easily washable copper oxalate which dries as a fine powder and requires no grinding. These are the characteristics needed to render the excellent fungicide economically competitive.

SUMMARY OF THE INVENTION

It is therefore an object of this invention to provide an improved process for the manufacture of copper oxalate which is readily filterable, washable, and is readily dried to a fine powder that requires no grinding.

It is another object of this invention to provide an improved process for the manufacture of copper oxalate with permissible modifications and equivalents in the manufacturing process.

Still other objects will be apparent to those skilled in the art from the following description of this invention.

The foregoing objects are achieved according to the practice of this invention. Broadly, this invention is an improved process for the production of copper oxalate comprising reacting an aqueous solution of a ferrous salt with a water-soluble oxalate to yield ferrous oxalate, separating ferrous oxalate from the resulting acid solution, slurrying this ferrous oxalate in an aqueous solution of a copper salt to yield copper oxalate and a solution of a ferrous salt, and filtering copper oxalate from the solution of a ferrous salt.

Thus, by the practice of this invention, there is provided an improved process for preparing copper oxalate in a form which is readily filterable and washable, and is capable of being dried as a fine powder requiring no grinding.

DETAILED DESCRIPTION OF THE INVENTION

Copper oxalate is conventionally manufactured by reacting aqueous solutions of copper sulfate and oxalic acid. This process is undesirable in that the finely divided product from the reaction quickly plugs any filter, rendering filtration almost impossible. This reaction also results in a filter cake that is a pasty mass which cannot be thoroughly washed without repeated repulping and filtration, each filtration being as difficult as the previous one. The final filter cake on drying becomes a very hard mass that requires mechanical grinding to realize any of the benefits to be derived from its inherently small particle size.

I have now invented a novel method for manufacturing copper oxalate in a form which can be filtered, washed and dried as a fine powder that requires no grinding. The method comprises precipitating ferrous oxalate by adding an aqueous ferrous salt solution to a water-soluble oxalate, such as oxalic acid, ammonium oxalate, sodium oxalate, potassium oxalate, etc. The source of ferrous iron may be any suitable ferrous salt, such as the sulfate, chloride, acetate, or formate. Ferrous sulfate is the preferred salt since it is readily available. Also, the precipitation of ferrous oxalate is not instantaneous; and thus, from about 5 to about 15 minutes retention time with mild agitation is required to insure a complete reaction. The more expensive oxalate can also best be utilized by employing a slight stoichiometric excess of the ferrous salt.

The yellow precipitate of ferrous oxalate resulting from the foregoing reaction of ferrous sulfate and a soluble oxalate is subsequently filtered out, and the filtrate that contains by-product sulfuric acid or the like is discarded. It is not necessary to wash the precipitated yellow cake to remove all of the by-product $H_2SO_4$. However, some washing may be slightly beneficial.

The next step in the formation of copper oxalate is to slurry the freshly precipitated, undried ferrous oxalate in an aqueous solution containing a stoichiometric excess of copper salt. This step slowly converts the solid phase to copper oxalate. Any water-soluble copper salt may serve as a suitable source of copper, but copper sulfate is preferred. A retention time of about 2 hours with mild agitation insures substantially complete conversion of the ferrous oxalate to copper oxalate, so that the iron content of the product is decreased to about 0.1% wt. or lower. The resulting solid product is filtered off and thoroughly washed to remove any soluble materials, such as ferrous sulfate, copper sulfate and sulfuric acid. The washed filter cake is then dried.

This novel method for the production of copper oxalate may be represented by the following equations:

$$FeSO_4 + H_2C_2O_4 \rightarrow FeC_2O_4 + H_2SO_4$$

$$FeC_2O_4 + CuSO_4 \rightarrow CuC_2O_4 + FeSO_4$$

Thus, the final conversion to copper oxalate results in the formation of ferrous sulfate in solution; this ferrous sulfate may be readily recycled to form more ferrous oxalate in the initial reaction.

It should be pointed out that neither temperatuare nor concentration is critical at any stage of manufacture of copper oxalate. It should also be pointed out that oxidation of both oxalate and ferrous iron must be avoided. Therefore, nitrates and other oxidizing substances should not be employed.

My invention will be illustrated by the following specific example. This example describes my method of preparing 10 pounds of copper oxalate. A solution of 3,360 grams of $H_2C_2O_4 \cdot 2H_2O$ should first be prepared in 40 liters of water in the container that will be used as the reaction vessel which should have a total capacity of approximately 64 liters or more. The next step is to rapidly dissolve 10,000 grams of $FeSO_4 \cdot 7H_2O$ in 10 liters of warm or hot water in a separate container. This prepared $FeSO_4$ solution is added to the $H_2C_2O_4$ solution and mildly agitated for at least 15 minutes. After 15 minutes of agitation, the resulting slurry is filtered to obtain the precipitated ferrous oxalate in the form of a yellow cake. This ferrous oxalate is subsequently slurried in a solution of copper sulfate which has been previously prepared by dissolving 1,000 grams of $Cu_2SO_4 \cdot 5H_2O$ in 20 liters of water. This slurry is agitated for approximately 2 hours to effect the conversion of ferrous oxalate to copper oxalate, then filtered to recover the copper oxalate product. This product is now thoroughly washed and then dried at 60°C. The dried product weighs approximately 10 pounds and contains 39.5% by weight of copper and 0.1% by weight of iron.

While this invention has been illustrated by the foregoing discussions and presentation of a specific example, it will be understood that the scope of the invention is limited only by the appended claims.

I claim:

1. an improved process for the manufacture of copper oxalate comprising:
   a. reacting an aqueous ferrous salt solution with a soluble oxalate to precipitate ferrous oxalate;
   b. separating ferrous oxalate of step (a) from the resulting slurry;
   c. slurrying ferrous oxalate of step (b) in a solution of a water-soluble copper salt to yield copper oxalate and a solution of a ferrous salt; and
   d. filtering the copper oxalate of step (c) from the solution of said ferrous salt.

2. The method according to claim 1 including the additional step of washing the filtered copper oxalate of step (d) to remove any soluble materials.

3. The method according to claim 1 in which the ferrous salt of step (a) is ferrous sulfate.

4. The method according to claim 1 in which the soluble oxalate of step (a) is oxalic acid.

5. The method according to claim 1 in which the copper salt of step (c) is copper sulfate.

6. The method according to claim 1 in which the reacting solutions in step (a) are mildly agitated from about 5 to about 15 minutes to insure complete reaction.

7. The method according to claim 1 in which the soluble oxalate of step (a) is reacted with a slight stoichiometric excess of a ferrous salt.

8. The method according to claim 1 in which the ferrous oxalate of step (c) is slurried in a solution containing a stoichiometric excess of a copper salt.

9. The method according to claim 1 in which the slurrying of ferrous oxalate of step (c) in a solution of soluble copper salt is mildly agitated for approximately 2 hours.

10. The method according to claim 1 in which the filtered copper oxalate of step (d) comprises less than about 0.1% wt. iron.

11. The method according to claim 1 in which the copper oxalate of step (d) is filtered from the solution of ferrous salt, and said solution of ferrous salt is recycled to react with soluble oxalate to precipitate more ferrous oxalate.

* * * * *